Patented Feb. 16, 1932

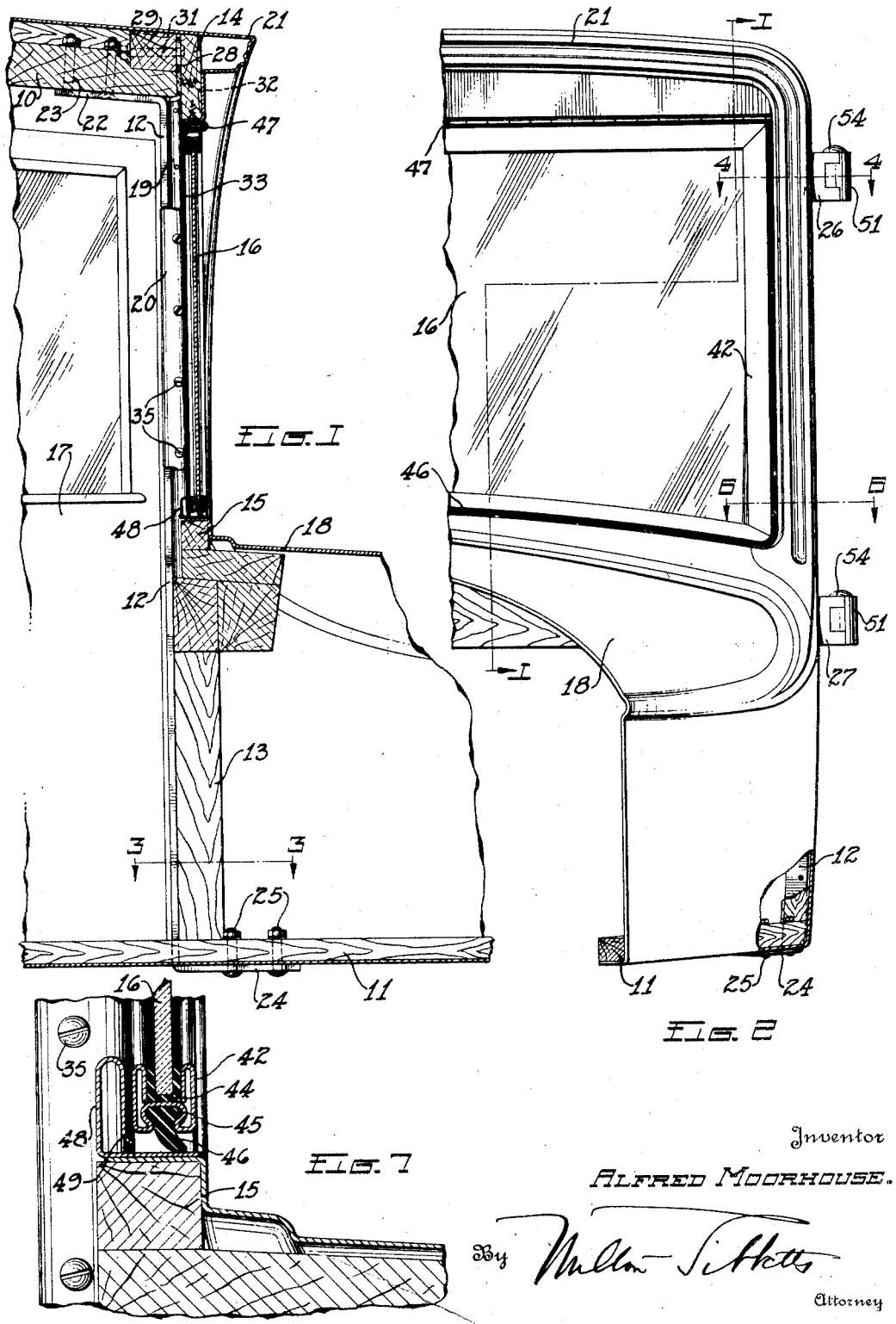

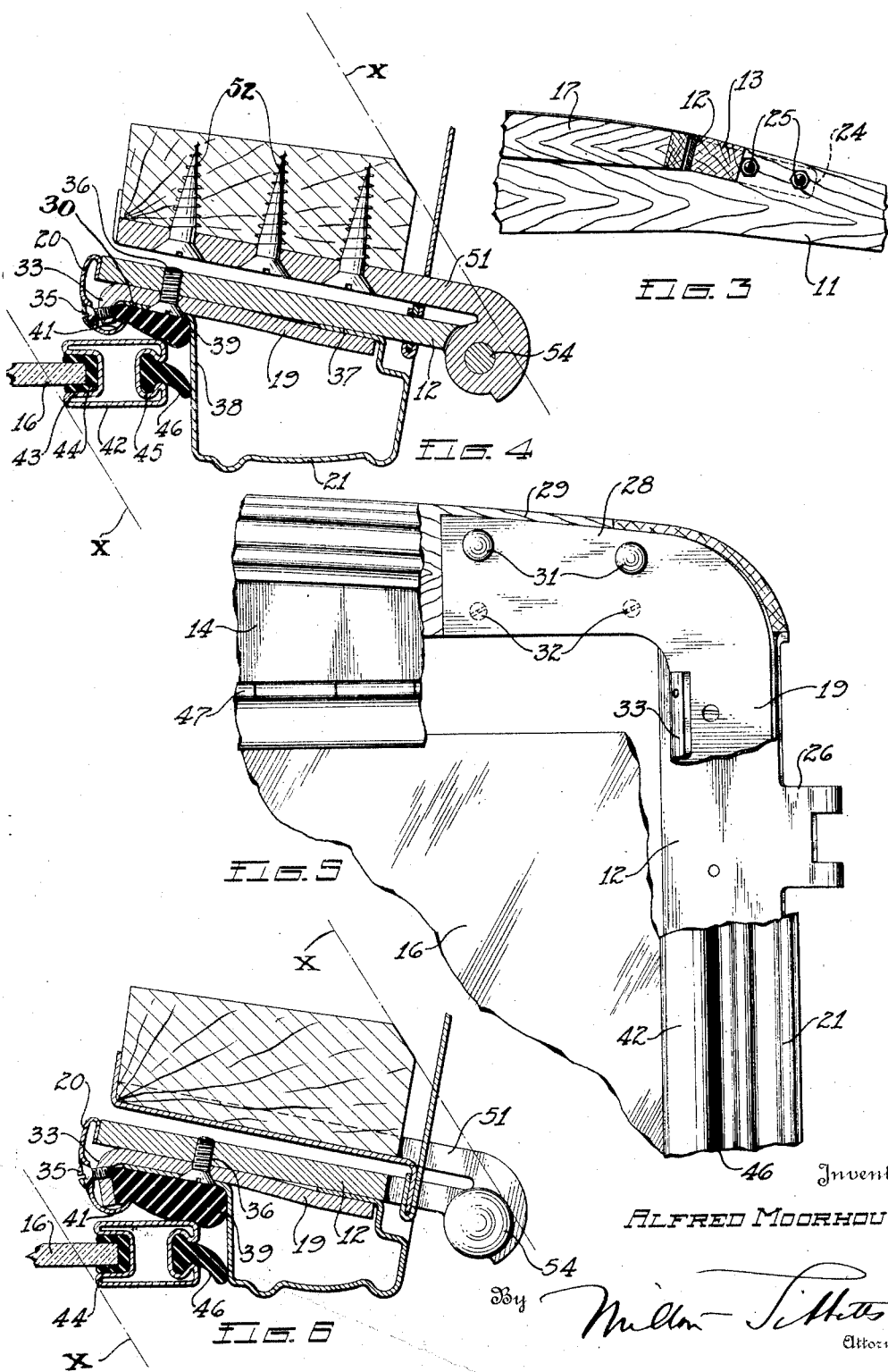

1,845,928

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed March 28, 1927. Serial No. 178,856.

This invention relates to motor vehicles and more particularly to the body and windshield construction thereof.

Present day congestion of automobile traffic and the increasing use of closed cars has focused the attention of automobile designers upon the problem of increasing the driver's range of vision. In closed cars, the driver's view is obstructed, at an important angle, by the front pillars of the body, which are provided to form a windshield casing and to support the top, the cowl and front doors of the body. Because these pillars must be strong enough to withstand considerable stress, they have usually been constructed of wood with a relatively large cross sectional area and of such shape as to materially reduce the range of the driver's vision.

An object of the present invention is to increase the range of vision from closed vehicles by reducing the obstruction caused by the front pillars.

A specific object is to provide a vehicle body with pillars of such material and so shaped and positioned as to materially reduce the obstruction to the vision of the driver caused thereby.

An additional object is to strengthen the pillars of a motor vehicle body.

A further object is to provide an ornamental windshield casing having resilient windshield stops.

A feature of the invention is a unitary closed body pillar construction adapted to increase the range of vision of the vehicle driver and to strengthen and ornament the body.

Another feature is a one-piece metal pillar having flanges for attachment to a top rail and sill of the body and other flanges constituting door hinge elements.

Another feature is a body pillar comprising a flat metal strip positioned at such angle with respect to the driver's seat as to only slightly obstruct the driver's vision.

A further feature is a metal pillar of small area, having means, for attachment of trim mouldings and windshield cushions, adapted to be concealed by the mouldings.

Other features and objects of the invention will appear from the following description taken in connection with the drawings, which form a part of this specification, wherein like reference characters have been used to indicate like parts and, wherein:

Fig. 1 is a sectional view taken substantially on line 1—1 of Fig. 2, of the front end of a motor vehicle body made in accordance with this invention;

Fig. 2 is a front view of the body partially broken away, showing the ornamental trim moulding, and the bottom flange of the pillar;

Fig. 3 is a view in section on line 3—3 of Fig. 1;

Fig. 4 is an enlarged view in section on line 4—4 of Fig. 2;

Fig. 5 is an enlarged detail view of a top corner of the body, showing the metal clip for supporting the trim mouldings and integral hinge flange of the pillar;

Fig. 6 is an enlarged view in section on line 6—6 of Fig. 2, and

Fig. 7 is an enlarged view in section of the lower part of the windshield frame showing the combined finish strip and resilient windshield stop.

In Figs. 1 and 2, the front part of a motor vehicle body is shown in which a top side rail 10 is supported upon a one-piece metal strip pillar 12 attached to a sill 11. The pillar 12 is also adapted to support the header 14 and and the lower cross member 15, the cowl member 18 and the door 17. A short wooden pillar 13 extending from the sill to the cowl member 18 and a metal strip or clip 19 adapted to support inner and outer trim mouldings, are also attached to the pillar 12.

Although only one side of the vehicle is shown in the drawings and hence only one pillar, it will, of course, be understood that there is another pillar on the opposite side of the body constructed similarly to the one shown and described, the two pillars forming the sides of a casing for the windshield 16.

The pillar 12 includes a rearwardly projecting flange 22 at its upper end, attached to the top rail by means of bolts 23, and a forwardly projecting flange 24 at its lower end, attached to the under side of the sill by means of bolts 25. The pillar 12 is positioned in the notch provided for the door and extends beneath the sill as shown in Fig. 3. Intermediate, outwardly projecting flanges 26 and 27 on the pillar 12 constitute door hinge elements.

The clip 19 comprises a metal strip fastened to the pillar 12 and has a laterally projecting flange 28, attached to the front of the cross member 29 of the top by bolts 31 and to the back of the header 14 by wood screws 32. The inner edge of the clip 19 turns forward, providing a flange 33, to which the inner trim moulding 20 is attached by screws 35. The clip 19 extends along the pillar 12 to a point somewhat below the cross member 15 and is attached to the pillar by machine screws 36, Fig. 4. The screws 36, also serve to fasten the inner edge 30 of the outer trim moulding 21 to the pillar, the outer edge 37 of the moulding being clamped between the outer edge of the clip 19 and the pillar 12. The moulding 21 extends up each side of the windshield opening and across the header, and in co-operation with the moulding 20 conceals the clip 19 and pillar 12 and gives an ornamental and finished appearance to the pillars and header. The edge of the inner moulding 20 is curved at 41 to form a hook around the flange 33 of clip 19. The sides of the moulding 21 provide shoulders 38, which, together with the flange 33 of the clip and the trim moulding 20 are adapted to retain a windshield cushion, comprising a rubber strip 39.

The windshield 16 includes side frame portions 42 of H-shaped cross section providing an inner channel 43 for retaining a rubber bushing 44 adapted to receive the edge of the windshield, and an outer channel 45, in which a weather strip 46, preferably of rubber, is retained. The top and bottom members of the windshield frame are somewhat differently shaped. The rubber strip 46 extends around the sides and bottom of the windshield frame and is adapted, when the windshield is closed, to engage the shoulder 38 of the outer trim moulding, making a weatherproof joint. The sides of the frame 42 of the windshield abut against the cushions 39, which provide resilient stops. Inside of the lower edge of the windshield, a moulding strip 48, having a downwardly projecting flange 49, is attached to the cross member 15 in any suitable manner. This strip which is preferably of spring material, extends the full length of the bottom of the windshield frame and, in co-operation with the cushion 39, provides a resilient stop for the windshield.

The upper edge of the windshield is attached to a hinge 47, preferably of the piano type and this hinge is also attached to the header 14 in any suitable manner for supporting the windshield and permitting it to be opened and closed.

The pillar 12 is positioned at an angle with respect to the line of vision of the driver, which line is indicated substantially by the broken lines X in Figs. 4 and 6, so that the obstruction to the driver's vision is considerably reduced. Moreover the other elements of the structure co-operate in effecting this result. For example the frame member 42 is made relatively narrow and the outer and inner trim mouldings are made relatively flat so as not to project into the line of vision of the driver.

The trim mouldings 20 and 21 are not only adapted to ornament the pillars in the usual manner but perform an additional function as already explained, namely that of retaining the rubber cushion strip 39 and the weather strip 46. In addition the outer trim moulding flares out at its upper part so as to provide an ornamental cornice and visor for the body.

The door 17 includes hinge elements 51, which are attached to the door frame by screws 52, Fig. 4, and which are pivoted to the integral hinge element 26 of the pillar 12 by a pintle 54. The door includes a hinge of similar construction pivoted to the hinge element 27 on the pillar.

Although this invention has been described in connection with a specific embodiment, it is not to be understood that the invention is limited to the exact details of construction, since it will be apparent that changes, comprehended within the invention, may be made therein as will be apparent to persons skilled in the art. The invention is therefore to be limited only as indicated by the scope of the appended claims.

What is claimed is:

1. In a motor vehicle, a body including a top side rail and a sill, a one-piece metal pillar extending from said rail to said sill, said pillar having oppositely disposed flanges respectively secured beneath the said rail and sill, and additional flanges integral with said pillar adapted to constitute door hinge elements.

2. In a motor vehicle, a body comprising a windshield, a windshield cushion, and a trim moulding, said body also having a metal pillar comprising a metal strip, a metal clip attached to said pillar and extending along a portion thereof adjacent to the windshield opening, and a flange on said clip adapted to retain said windshield cushion and to support said trim moulding.

3. In a motor vehicle, a body comprising a windshield opening, metal pillars positioned on opposite sides of said opening, a trim moulding having a flare at the top portion providing an ornamental cornice, and metal clips attached to said pillars for retaining the edge of said trim moulding.

4. In a motor vehicle, in combination, a top rail, a sill, a cowl member, a wooden pillar attached to said sill and extending only to said cowl, a metal strip pillar adjacent to said wooden pillar, said strip extending from said sill to said rail, a flange on each end of said strip being attached to said sill and rail respectively, a clip having a flange, a header attached to said flange of said clip, and a door and a plurality of trim mouldings attached to said metal strip pillar, whereby the range of vision is increased.

5. In a motor vehicle body frame the combination with a sill and a top side rail, of a one piece pillar having its ends bent in opposite directions and secured in a substantially longitudinal position, respectively to the top rail and to the bottom of the sill.

6. In a motor vehicle body frame the combination of a top side rail and a sill, of a one piece pillar having oppositely disposed flanges adapted to be secured to and beneath the top side rail and to the bottom of the sill respectively.

7. In a motor vehicle body frame the combination with a top side rail and a sill, of a one piece pillar connecting the top side rail and the sill, the pillar having a plurality of hinge members formed integral therewith, a clip positioned on the pillar, and a plurality of mouldings secured to the pillar by the clip.

8. In a motor vehicle body frame the combination with a top side rail and a sill, a one piece pillar, a clip on the pillar, a plurality of mouldings secured on the pillar by the clip and a cushion supported by and between the mouldings.

9. In a motor vehicle body frame the combination with a top side rail and a sill, of a one piece pillar having its ends bent in opposite directions and secured substantially longitudinally of the top side rail and the sill and beneath the top side rail and the sill.

10. In a motor vehicle the combination with a frame and a windshield, of a stop for the windshield comprising a moulding bent in an angular form, one leg of which is folded back upon itself within the angle.

11. In a motor vehicle the combination with a frame and a windshield, of an angular moulding for the frame having one leg thereof bent back upon itself within the angle and flared outwardly to provide an abutment for the windshield.

In testimony whereof I affix my signature.
ALFRED MOORHOUSE.